(12) United States Patent
Bourget et al.

(10) Patent No.: US 7,367,774 B2
(45) Date of Patent: May 6, 2008

(54) SYSTEM FOR PROTECTING A MAIN SHAFT OF AN ENGINE HAVING A FUSIBLE BEARING

(75) Inventors: Sébastien Bourget, Tournan en Brie (FR); Bruno Dambrine, Le Chatelet en Brie (FR); Claude Mons, Savigny le Temple (FR); Jean-Luc Soupizon, Vaux le Penil (FR)

(73) Assignee: SNECMA, Paris (FR)

( * ) Notice: Subject to any disclaimer, the term of this patent is extended or adjusted under 35 U.S.C. 154(b) by 569 days.

(21) Appl. No.: 11/100,473

(22) Filed: Apr. 7, 2005

(65) Prior Publication Data
US 2005/0249580 A1    Nov. 10, 2005

(30) Foreign Application Priority Data
Apr. 14, 2004  (FR) .................................. 04 03911

(51) Int. Cl.
*F01D 21/00*   (2006.01)
(52) U.S. Cl. .................... 415/9; 415/174.1; 415/216.1; 416/244 A
(58) Field of Classification Search .................... 415/9, 415/174.1, 216.1, 217.1, 229; 416/244 A
See application file for complete search history.

(56) References Cited
U.S. PATENT DOCUMENTS
3,880,479 A * 4/1975 De Feo et al. .............. 384/129
6,135,712 A * 10/2000 Chevrollier et al. ..... 415/216.1

FOREIGN PATENT DOCUMENTS
FR        2 773 586        7/1999

* cited by examiner

*Primary Examiner*—Igor Kershteyn
(74) *Attorney, Agent, or Firm*—Oblon, Spivak, McClelland, Maier & Neustadt, P.C.

(57) ABSTRACT

A turbomachine comprising at least a first rotary assembly with a first shaft, a stator, and bearings secured to the stator and suitable for supporting the shaft, one of the bearings being capable of giving way when an unbalance occurs in the rotary assembly, at least one segment of the shaft being covered in a covering which comprises at least one piece of fabric impregnated with resin and which is for coming into contact with a surrounding portion of the turbomachine when the unbalance occurs in order to protect the first shaft and ensure that there is no risk of the first shaft rupturing. The turbomachine is intended to be used mainly in the field of aviation, and more particularly as an airplane turbojet.

13 Claims, 3 Drawing Sheets

SYSTEM FOR PROTECTING A MAIN SHAFT OF AN ENGINE HAVING A FUSIBLE BEARING

FIELD OF THE INVENTION

The invention relates to a turbomachine which comprises at least a first rotary assembly with a first shaft, a stator, and a "fusible" bearing secured to the stator and suitable for supporting said shaft and being capable of giving way when an unbalance occurs in the first rotary assembly. The turbomachine is intended to be used mainly in the field of aviation, and more particularly as an aeroengine.

BACKGROUND OF THE INVENTION

An example of this type of turbomachine is shown in FIG. 1 which shows an airplane turbojet 1 of well known type. The turbojet 1 comprises first and second rotary assemblies 10, 9 surrounded by a stator 2, and separated from said stator by a main flow path 3 of annular section. The main flow path 3 is occupied by stages of blades secured alternately to said rotary assemblies 9 and 10 and to the stator 2 so as to accelerate and compress the gas in order to benefit from the energy that it releases while expanding, after combustion of the fuel. Going from the front to the rear, there are to be found: the blades of a low-pressure compressor 4, the blades of a high-pressure compressor 5, a combustion chamber 6, the blades of a high-pressure turbine 7, and the blades of a low-pressure turbine 8. The first rotary assembly 10 comprises the rotor of the low-pressure compressor 4, the rotor of the low-pressure turbine 8, and a first shaft 12 providing the connection between the two above-mentioned rotors, and also referred to as a "low-pressure" shaft or a main shaft. The second rotary assembly 9 comprises the rotor of the high-pressure compressor 5, the rotor of the high-pressure turbine 7, and a second shaft 11 providing the connection between the two above-mentioned rotors 5 and 7, and also referred to as a "high-pressure" shaft. Since the turbojet 1 comprises two rotary assemblies or spools 9 and 10, it is generally referred to as a twin-spool turbojet.

The first and second shafts 12 and 11 are coaxial and rotate at different speeds, the speed of rotation of the first shaft 12 being less than the speed of rotation of the second shaft 11. Both shafts are supported by means of bearings connected to the stator 2. Going from the front to the rear, there are to be found: a front bearing 13 for the first shaft 12, a front bearing 14 for the second shaft 11, a rear bearing 15 for the second shaft 11, and a rear bearing 16 for the first shaft 12. As their active elements, the bearings comprise one or two ball- or roller-bearings that enable the shafts 11 and 12 to rotate at high speed, independently from each other; the shafts 11 and 12 are thus completely separate from each other and mechanically independent. However it should be observed that they are separated by only a small amount of clearance over a rather long proximity zone 17 situated substantially in the vicinity of the front bearing 14 of the second shaft 11.

Modern airplane turbojets have a high compression ratio and a high by-pass ratio. They are thus provided with an auxiliary flow path 18 surrounding the main flow path 3, with air traveling along said auxiliary flow path and being mixed with the combustion gas at the rear of the low-pressure turbine 8 (such turbojets are called turbofans). The air traveling along the auxiliary flow path 18 is accelerated by the blades of a fan 19 that is secured to the first rotary assembly 10 and that extends in front of the low-pressure compressor 4. The blades of the fan 19 have a very large diameter and considerable inertia. They are also subject to rupture when the airplane is in flight and when a foreign body, such as a bird, accidentally comes into contact with said blades.

As soon as a fan blade is ruptured, a significant unbalance occurs in the first rotary assembly 10, thereby producing significant vibration forces thereon, which forces are transmitted to the second rotary assembly 9 and to the stator 2 via the front bearing 13. The damage resulting from such excessive forces is capable of propagating throughout the turbojet 1. For this reason, it is known to use a "fusible" front bearing 13, i.e. a bearing that is capable of being broken or of giving way in some other way when an unbalance occurs in the first rotary assembly 10. That type of bearing 13 generally includes a break starter in the vicinity of the first shaft 12, which starter is generally a thin portion connecting it to the stator 2, or small-diameter connection bolts having threaded shanks that may be notched; an example of that type of bearing is described in U.S. Pat. No. 5,417,501. The break starter is designed so as to tear or to rupture when the unbalance occurs, so that the front bearing 13 becomes detached from the stator 2 and ceases to support the first shaft 12, which then becomes free to oscillate by tilting about the rear bearing 16, thereby no longer imparting excessive force on the stator 2. Faced with such a problem, the pilot generally shuts down the corresponding turbojet (i.e. stops fuel combustion), thereby no longer driving the shafts 11 and 12 in rotation. The speed of rotation of the shafts 11 and 12 thus decreases and the second shaft 11 progressively stops turning. As the airplane continues its flight, the fan 19 driven by the air which passes therethrough continues to turn slowly (relative to its normal speed) and drives the first shaft 12 in rotation; the first rotary assembly 10 and the shaft 12 are said to be windmilling.

Considerable damage may occur from the moment when the front bearing 13 gives way to the moment when the first shaft 12 windmills slowly, i.e. while the shafts 11 and 12 are still turning at high speed and touching each other in the proximity zone 17, as shown in FIG. 2, due to the fact that the first shaft 12 is rocking around the rear bearing 16. When the shafts come into contact with each other, considerable heating is caused by the friction resulting from the speeds of rotation of said two shafts 11 and 12 that are very different and very high (e.g. 4,500 revolutions per minute (rpm) and 17,000 rpm. Heat dissipation is concentrated in a limited contact zone 20 around the circumference of the first shaft 12, and is such that the shaft 12 is damaged at that location and passes to a metallurgical state where it is weaker, and even likely to rupture. There is then a risk of losing the fan 19 when the first shaft 12 ruptures. Moreover, since contact between the shafts also damages the second shaft, both shafts 11 and 12 need to be replaced during repair work.

To avoid such drawbacks, a known solution, described in French patent No. 2 773 586 attempts to ensure that the two shafts 11 and 12 quickly start functioning at the same speed so that friction, and hence heating, is limited. That solution consists in covering the proximity zone 17 of the first shaft 12, i.e. the shaft rotating more slowly than the second shaft 11, in a covering having low thermal conductivity and capable of being machined by milling or the equivalent. Such a covering consists of a layer of zirconia, yttrium-containing zirconia, alumina, boride, or carbide.

Nevertheless, despite the low thermal conductivity of the covering, it is observed that the capacity of said covering for machining by milling leads to a considerable rise in temperature (often in excess of 1000° C.) which has a negative effect on the properties of the two shafts 11 and 12, thereby not sufficiently removing the risk of the first shaft 12 rupturing, and the dramatic consequences that such a rupture would incur.

OBJECT AND SUMMARY OF THE INVENTION

The present invention seeks to protect the first shaft more effectively, and to prevent any risk of said shaft rupturing.

To achieve this object, the invention provides a turbomachine comprising at least a first rotary assembly with a first shaft, a stator, and bearings secured to the stator and suitable for supporting said shaft, one of said bearings being capable of giving way when an unbalance occurs in the rotary assembly, wherein at least one segment of said shaft is covered in a covering which comprises at least one piece of fabric impregnated with resin and which is for coming into contact with a surrounding portion of the turbomachine when said unbalance occurs.

The new type of covering used to protect the first shaft reduces friction between said shaft and said surrounding portion of the turbomachine, and thus reduces heating.

Before setting out the advantages of the turbomachine of the invention, it is appropriate to note that said turbomachine may have one or more rotary assemblies. Thus, when the turbomachine has only one rotary assembly, the surrounding portion of the turbomachine with which said assembly will come into contact in the event of a fan blade rupturing belongs to the stator. However, when the turbomachine has a plurality of rotary assemblies, said surrounding portion can belong to the stator or to one of the other rotary assemblies.

The turbomachine is advantageously an aeroengine and more particularly a turbojet. It should be understood that the turbojet can be a single-spool, twin-spool, or three-spool turbojet. In the particular case of a twin-spool turbojet, similar to the turbojet shown in FIG. 1, the turbomachine has a second rotary assembly with a second shaft, the first and the second shafts being coaxial and capable of rotating at different speeds, and the first shaft rotating more slowly than the second. In this type of turbomachine, said surrounding portion preferably belongs to the second shaft.

The invention is characterized by the nature of the covering that is disposed around the segment of the first shaft. As indicated above, said composite covering comprises a piece of fabric impregnated with resin. The use of such a covering makes it possible, firstly, to protect said shaft segment by preventing it from coming into direct contact with said surrounding portion and, secondly, to reduce friction between the segment covered with the covering and said surrounding portion.

Advantageously, in order to reduce friction even further, the resin contains dry lubricants so that the coefficient of friction between the covering and said surrounding portion is reduced. Advantageously, said lubricants are selected from the following lubricants: graphite, molybdenum disulfide, and boron nitride, and they are added to the resin in proportions ranging from a very low percentage to 30%, or even 40%, depending on the lubricants; and the average particle size of the dry lubricants used lies in the range 2 micrometers ($\mu$m) to 10 $\mu$m.

Of course, friction is reduced to the detriment of braking of the first shaft, although it ensures great safety since the risk of the shaft rupturing is reduced to zero. Indeed, by reducing friction, the temperature to which the elements that are in contact with one another rise is also reduced, so their mechanical properties are preserved, in particular their breaking strength and their resistance to fatigue.

Advantageously, a resin is selected that presents low thermal conductivity, that withstands temperature well, and that presents good mechanical properties. Examples of highly suitable resins are as follows: epoxy resins, bismaleimide resins, and phenolic resins. The ability of the resin to withstand temperature must be selected in particular as a function of the normal operating conditions of the first shaft, i.e. when not in any contact: when the operating temperature of the shaft does not normally exceed 120° C., epoxy resins can be used, while at higher temperatures bismaleimide resins and particularly phenolic resins are preferred.

The piece of fabric makes it possible to reinforce the mechanical strength of the covering when it comes into contact with the surrounding portion of the turbomachine. Said piece of fabric is either pre-impregnated with resin and then wound around the first shaft, or else it is firstly wound therearound and is then impregnated with resin. Said piece of fabric can be wound around the shaft several times in such a manner as to adjust the thickness of the covering and/or to reinforce its mechanical strength.

Advantageously, said piece of fabric is formed by a braid of fibers and is wound around said segment.

In another embodiment of the invention, the piece of fabric is formed by a sleeve of fibers capable of being slid onto the first shaft. This particular shape and capability make it easier to put said piece of fabric into place.

Moreover, the shaft segment to be covered is generally situated between two adjacent shaft portions of outside diameter greater than the outside diameter of the segment to be covered, so that putting a sleeve into place around said segment can be difficult. In particular, if a sleeve is selected that has a larger diameter than the greatest diameter of the shaft, then a gap remains between the sleeve and the shaft segment that is to be covered, and this gap may cause a problem when it comes to applying the resin in order to secure the covering to the shaft, or to ensure said covering behaves well on the shaft.

In order to resolve this additional problem, the fibers of the sleeve are advantageously braided so that said sleeve is deformable. Thus, when the sleeve is slid onto the shaft, it is stretched radially so as to increase its diameter and pass over portions of the shaft having a diameter that is greater than the diameter of the segment to be covered, thereby enabling the sleeve to be positioned easily on the segment. Once positioned correctly, the sleeve is stretched axially so as to reduce its diameter and so as to press it around said segment.

To make it easier to put into place, the sleeve is advantageously elastically deformable. By way of example, this elasticity can be obtained by the braiding of the fibers and the fiber ratio that is used. Thus, the dimensions of the sleeve are selected in such a manner that, at rest, its diameter is not greater than the outside diameter of the shaft segment to be covered. Hence, said sleeve itself fits snugly around the segment of the shaft that is to be covered so that there is no gap between the shaft and the sleeve.

In order to adjust the thickness of the covering and/or to reinforce its mechanical strength, it is advantageously possible to slide a plurality of sleeves onto the shaft and to superpose them.

In another embodiment of the invention, after the speed of rotation of the first shaft has decreased sufficiently after the turbomachine has stopped, attempts are made to slow down the first shaft substantially (when the turbomachine is an aeroengine, it is the pilot to who decides to stop the engine). In other words, when the unbalance has just occurred and the first shaft is still rotating very fast, attempts are made firstly, as described above, to reduce friction between said first shaft and the surrounding portion of the turbomachine, by means of the resin/fabric covering. This reduces heating, which increases with increasing friction levels and with increasing speeds of rotation of the first shaft relative to said surrounding portion. Once the speed of rotation of the shaft has decreased sufficiently of its own accord, it is possible to slow down said shaft significantly by increasing friction between said shaft and said surrounding portion by means of a material that is different from the resin/fabric covering without too great a risk of heating. In order to increase friction, a first intermediate layer is disposed between the shaft segment and the covering, such that the coefficient of friction between said intermediate layer and said surrounding portion of the turbomachine is greater than the coefficient of friction existing between the covering and said surrounding portion. The coefficient of friction between the intermediate layer and the surrounding portion is selected to be sufficiently high to slow down the first shaft significantly.

In another embodiment of the invention, it is possible to dispose a second intermediate layer between the shaft segment and the covering or between the shaft segment and the first intermediate layer, said second intermediate layer serving to prevent a galvanic-corrosion phenomenon from becoming established between the shaft and the covering or between the shaft and the first intermediate layer.

BRIEF DESCRIPTION OF THE DRAWINGS

The invention will be better understood and its advantages will appear clearly on reading the following detailed description of embodiments shown by way of non-limiting example. The description refers to the accompanying drawings, in which.

MORE DETAILED DESCRIPTION

Figure 1:
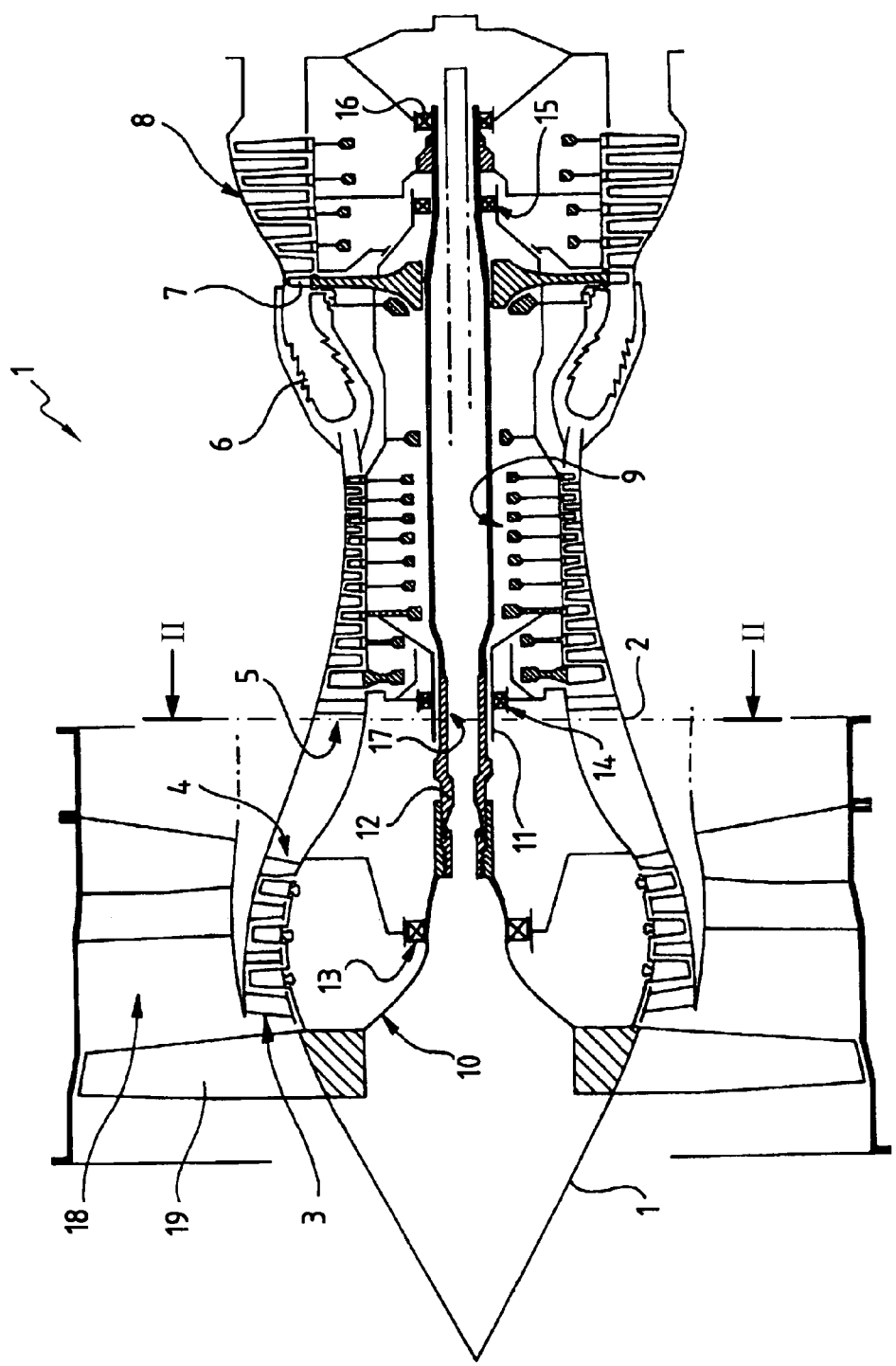
FIG. 1 is a section view of a known type of airplane turbojet.
Figure 2:
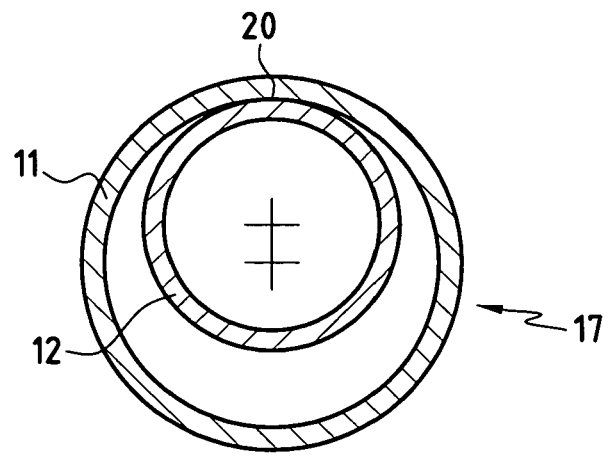
FIG. 2 is a section view on plane II-II of FIG. 1, showing two shafts of the FIG. 1 turbojet, when the first shaft is free to oscillate.

Above-described FIG. 1 shows a twin-spool airplane turbofan of well known type. The proximity zone 17 can be seen in which the first shaft 12 and the second shaft 11 are very close. It is in said zone that the two shafts 12 and 11 will come into contact with each other when the fusible bearing 13 gives way following the rupture of a blade of the fan 19. FIG. 2 is a section view on plane II-II that is perpendicular to the axis of the first shaft and that goes through the proximity zone 17. In FIG. 2, the first shaft 12 is free to move about inside the second shaft 11 after the fusible bearing 13 has ruptured and comes into contact with the second shaft 11 in the contact zone 20.

Figure 3:
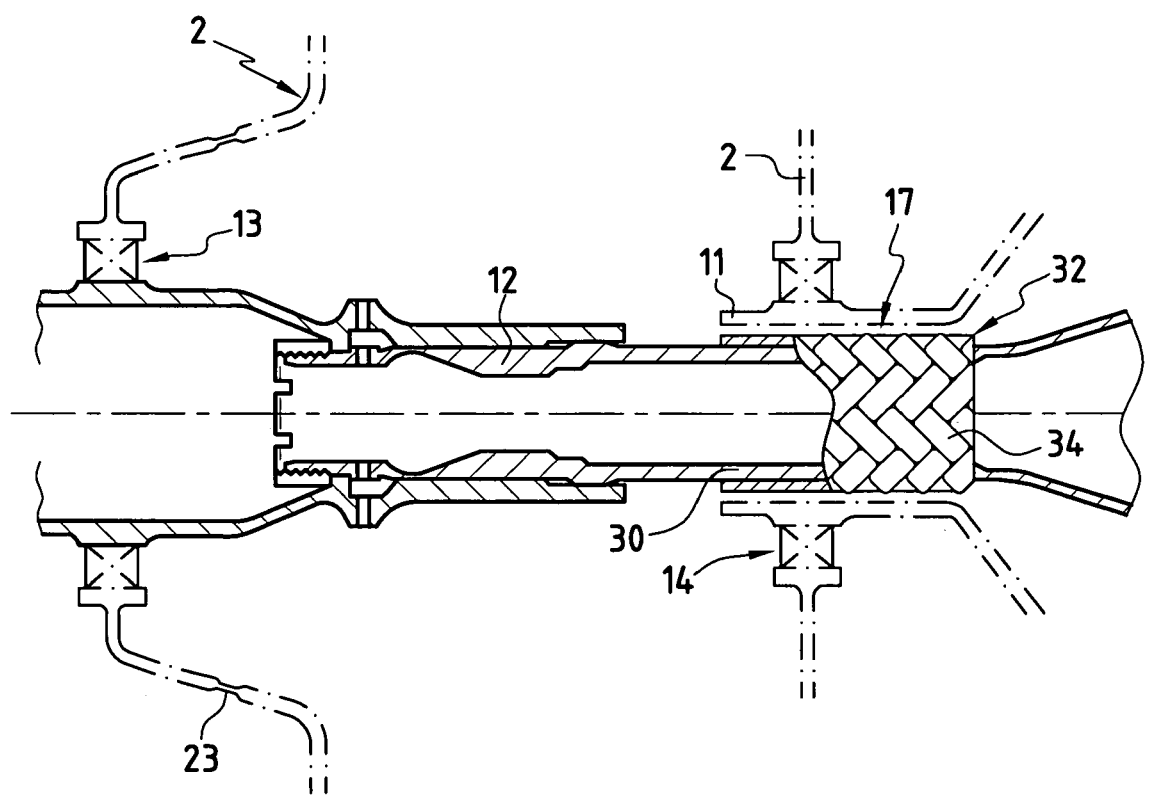
FIG. 3 is a partially cut away section view of a portion of a turbomachine of the invention showing the covering that covers a portion of the first shaft.
Figure 4:
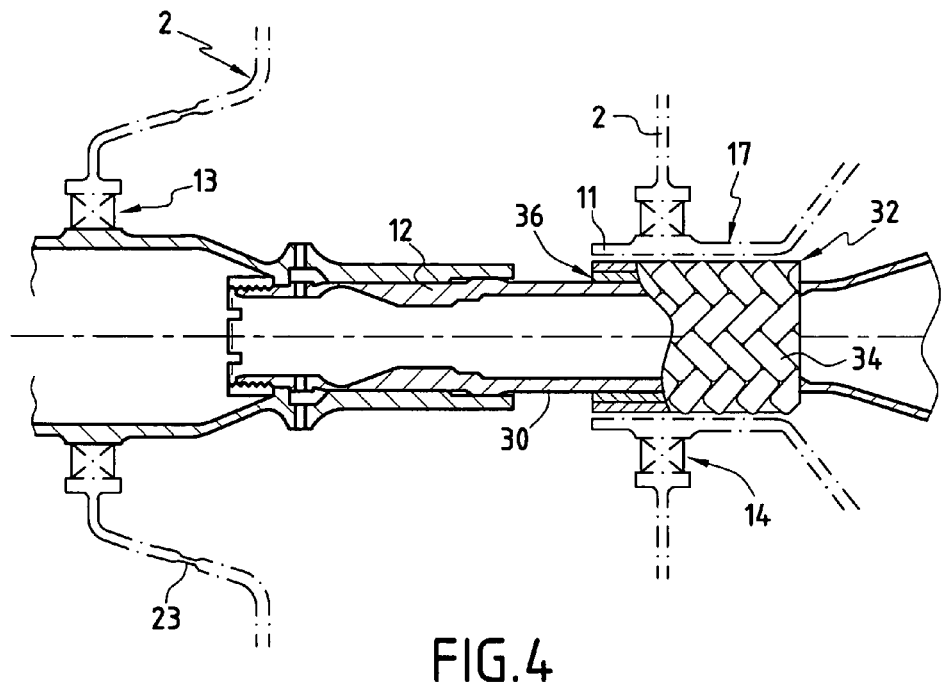
FIG. 4 is a section view identical to FIG. 3, showing a second embodiment of the turbomachine of the invention.
Figure 5:
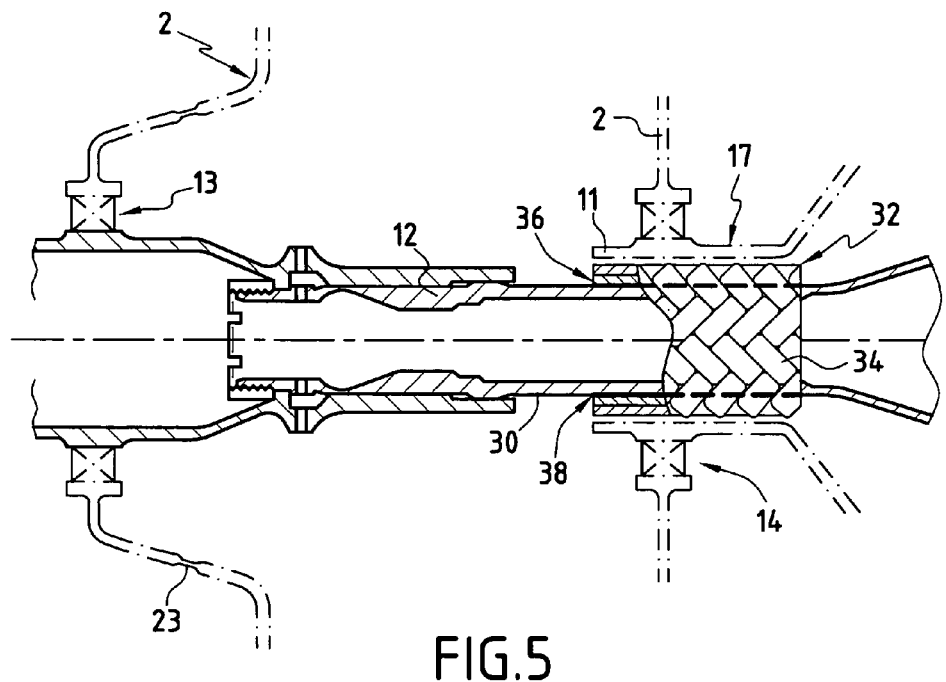
FIG. 5 is a section view identical to FIG. 3, showing a third embodiment of the turbomachine of the invention.

The turbomachines shown in part in FIGS. 3, 4, and 5 as embodiments of the invention are twin-spool airplane turbofans similar to the turbofan described above and shown in FIG. 1. For this reason, the same numeric references are used to designate those elements that are common both to the invention and to the prior art.

FIGS. 3, 4, and 5 show only the portion of a turbomachine that is situated in the vicinity of the proximity zone 17. In these figures, it can be seen that the first shaft 12 or "low-pressure" shaft is retained by a fusible front bearing 13 secured to the stator 2 and capable of being ruptured at its zones of weakness 23. The second shaft 11 is situated around the first shaft 12 (the shafts are coaxial) and is retained by the front bearing 14 secured to the stator 2. The shafts are particularly close to each other in the proximity zone 17. The segment 30 of the first shaft 12 situated in said zone 17 is surrounded on all sides by portions of the first shaft which present outside diameters that are greater than the diameter of said segment 30.

As shown in FIG. 3, the segment 30 is covered in a composite covering consisting of a sleeve 32 made of braided fibers 34, that are impregnated with phenolic resin. The resin may contain dry lubricants such as graphite, molybdenum disulfide, boron nitride, or any other known dry lubricant. The fibers 34 are lengths of carbon fiber, of aramid fiber, or of glass fiber, and have been braided so as to ensure that the sleeve 32 has a certain amount of elasticity, so that it is easy to put said sleeve into place. Thus, when the sleeve is slid onto the shaft, it deforms easily about the various shaft diameters and, when it comes to the segment 30, it fits it snugly. The sleeve is then impregnated with resin.

The fibers 34 are oriented so as to reinforce the mechanical strength of the covering. The coefficient of friction is low between the phenolic resin, used for the covering, and the surrounding portion of the turbojet against which said covering comes into contact. In this embodiment, said surrounding portion is formed by the second shaft 11. As a general rule, when the second shaft 11 is made of titanium alloy, said coefficient of friction lies in the range 0.1 to 0.6. For example, the coefficient of friction when rubbing against a phenolic resin is about 0.3. Hence, friction, and thus heating, are low, so that the first shaft 12 is not weakened.

Wear on the covering increases or decreases as a function of the materials used, the difference between the speeds of rotation of the first and second shafts, and the temperature in the zone 17.

In the particular embodiment of the invention shown in FIG. 4, firstly the shaft segment 30 is covered with a first intermediate layer 36, and then said layer 36 is covered by the composite fabric/resin covering. This intermediate layer 36 is made in graphite, for example. The coefficient of friction between this intermediate layer 36 and the second shaft 11 is higher than the coefficient of friction between the covering and the shaft 11, e.g. lying in the range 0.6 to 0.9. The intermediate layer 36 comes into contact with the second shaft 11 when the covering is worn. The mechanical strength and thickness of the covering are chosen in such a manner that the first intermediate layer 36 establishes contact with the second shaft 11 only once the speed of rotation of the first shaft 12 has slowed down sufficiently. When the speed is sufficiently slow, heating is reduced despite the high coefficient of friction between the intermediate layer 36 and the second shaft 11.

In the particular embodiment of the invention shown in FIG. 5, a second intermediate layer 38 has been disposed between the first intermediate layer 36 and the first shaft 12. This layer 38 seeks to prevent a galvanic-corrosion phenomenon from becoming established between the shaft 12 made of maraging steel or of high-strength steel, for example, and the first layer 36. Advantageously, the layer 38 is a layer of epoxyphenolic paint or of paint having aluminum pigment.

What is claimed is:

1. A turbomachine comprising at least a first rotary assembly with a first shaft, a stator, and bearings secured to the stator and suitable for supporting said shaft, one of said bearings being capable of giving way when an unbalance occurs in the rotary assembly, wherein at least one segment of said shaft is covered in a covering which comprises at least one piece of fabric impregnated with resin and which is for coming into contact with a surrounding portion of the turbomachine when said unbalance occurs.

2. A turbomachine according to claim 1, wherein said piece of fabric is made of braided fibers and is wound around said segment.

3. A turbomachine according to claim 1, wherein said piece of fabric is formed by a sleeve of fibers capable of being slid onto the first shaft.

4. A turbomachine according to claim 3, wherein, when the shaft segment is situated between two adjacent shaft portions of outside diameter greater than the outside diameter of the segment, said sleeve is deformable.

5. A turbomachine according to claim 4, wherein the covering includes a plurality of sleeves of superposed fibers.

6. A turbomachine according to claim 2, wherein the fibers are selected from the following reinforcement fibers: carbon fibers, aramid fibers, and glass fibers.

7. A turbomachine according to claim 1, wherein the resin is selected from the following resins: epoxy resins, bismaleimide resins, and phenolic resins.

8. A turbomachine according to claim 1, wherein the resin contains dry lubricants so that the coefficient of friction between said covering and the surrounding portion of the turbomachine is reduced.

9. A turbomachine according to claim 1, wherein a first intermediate layer is disposed between the shaft segment and the covering, and is such that the coefficient of friction between said intermediate layer and the surrounding portion of the turbomachine is greater than the coefficient of friction existing between the covering and said surrounding portion.

10. A turbomachine according to claim 1, wherein a second intermediate layer is disposed between the shaft segment and the covering or between the shaft segment and the first intermediate layer, said second intermediate layer serving to prevent a galvanic-corrosion phenomenon from becoming established between the first shaft and the covering or the first intermediate layer.

11. A turbomachine according to claim 1, further comprising a second rotary assembly with a second shaft, the first and second shafts being coaxial and capable of rotating at different speeds, and wherein said surrounding portion belongs to the second shaft of the turbomachine.

12. A turbomachine according to claim 1, wherein said surrounding portion belongs to the stator of the turbomachine.

13. A turbomachine according to claim 1, wherein the turbomachine is an aeroengine.

* * * * *